May 7, 1963  A. G. SCHILBERG  3,088,749
FRAME CONSTRUCTION
Filed June 3, 1960
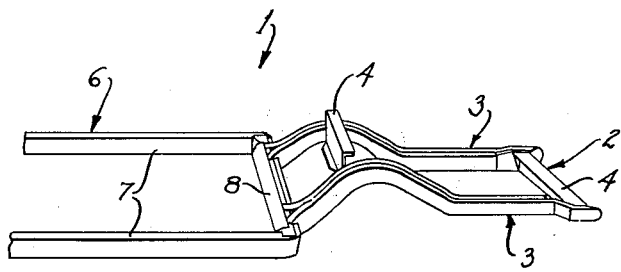
FIG. 1
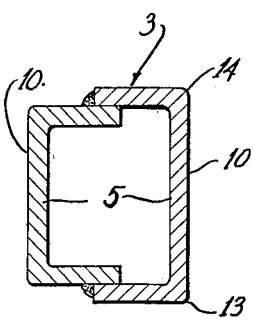
FIG. 4
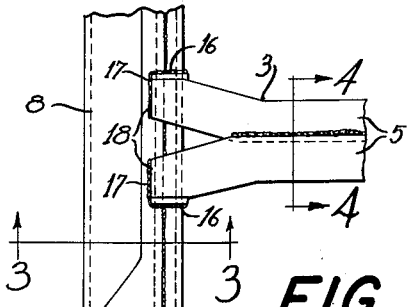
FIG. 2
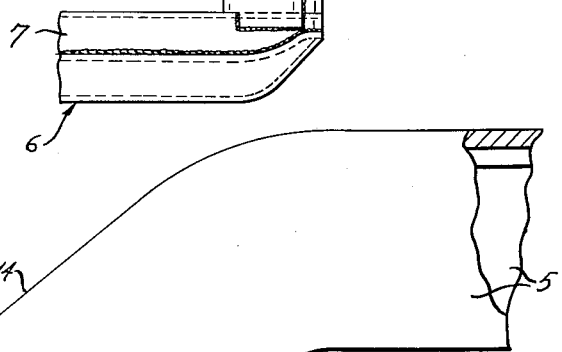
FIG. 3
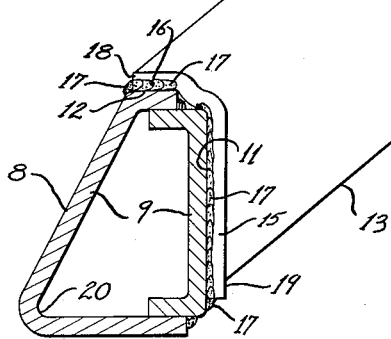
INVENTOR.
ARNOLD G. SCHILBERG
BY
Andrus & Starke
Attorneys United States Patent Office 3,088,749
Patented May 7, 1963

3,088,749
FRAME CONSTRUCTION
Arnold G. Schilberg, Milwaukee, Wis.; Irene G. Schilberg, special administratrix of the estate of said Arnold G. Schilberg, deceased, assignor to A. O. Smith Corporation, Milwaukee, Wis., a corporation of New York
Filed June 3, 1960, Ser. No. 33,702
1 Claim. (Cl. 280—106)

The present invention relates to an improved vehicle frame construction and has particular reference to a sectional vehicle frame construction and to the manner in which the several frame sections are interconnected.

In the wide-hipped vehicle frame construction, sometimes referred to as an offset-type frame, the frame is formed of a wide central section connected rigidly to separate front and rear sections of reduced width to provide a lightweight, high strength frame structure. The interconnection of the several frame sections is effected by means of tubular frame connectors in the form of cross bars or torque boxes extending transversely between the ends of the central frame side rails and the corresponding inner ends of the forward and rear frame side rails.

With this type of frame construction, the tubular connectors are subjected to substantial torsional forces due to the offset position of the several frame sections. The torsional rigidity of the connectors is thus of critical importance and, unless suitably reinforced, the connectors tend to assume a deformed or distorted sectional area in response to these forces with a consequent further loss in rigidity.

To prevent the aforementioned effects, the connectors are ordinarily provided with a bulkhead shaped to the sectional area of the member and secured internally thereof as by welding. While from a structural standpoint the use of the bulkhead is satisfactory, the internal placement results in considerable fabrication and design problems. On the other hand, the bulkhead must be accurately shaped to complement the member it is to reinforce as completely as possible while permitting unobstructed assembly of the latter. In addition, the internal bulkhead requires a welding operation to fix it in operative position, and as the torque box or cross bar is normally a closed section, access to the bulkhead for repair or replacement purposes is exceedingly difficult.

The present invention is directed to a structure for joining the side rails of the forward and rear frame sections to the tubular connectors which inherently reinforces the latter against deformation, thereby eliminating the need of internal bulkheads along with the attendant design and fabrication problems connected therewith.

According to the invention, the side rails of the front and rear frame sections are notched at their inner ends to provide an end edge adapted to complement the trace defined by all but two successive sides of the tubular connecting member which is formed with a closed section of four or more sides. The notched ends of the frame side rails are welded to the corresponding walls of the connector member to fully girdle or encompass all but two sides of the member and to leave only one corner thereof unsupported.

The above-described attachment means imparts substantial rigidity to the connector member since for any section deformation to occur, two or more corners of the member must change their angular position, a condition not possible in the present invention unless the side rail itself is deformed at its connected end.

A frame embodying the principle of the present invention eliminates fabrication problems heretofore present in frames of similar construction and permits substantial savings in frame cost.

The accompanying drawing illustrates the best mode presently contemplated of carrying out the present invention.

In the drawing:

FIG. 1 is a perspective view of the rear portion of a motor vehicle frame embodying the present invention;

FIG. 2 is an enlarged fragmentary plan view of FIG. 1 illustrating the manner in which the rear frame side rails are connected to the frame cross-bar;

FIG. 3 is a view along the lines 3—3 of FIG. 2; and

FIG. 4 is a view along the lines 4—4 of FIG. 2.

With reference to the drawing and particularly to FIG. 1, the portion of the motor vehicle frame 1 illustrated therein is formed rearwardly of a relatively narrow frame section 2 comprising a pair of "kicked-up" side rails 3 connected in spaced, parallel relation by the cross bars 4. As shown in FIG. 4, side rails 3 are composite members formed of a pair of channeled plates 5 welded together in facing and overlapping relation to form a box section.

The central frame section 6 includes a pair of parallel extending box-section side rails 7 disposed in outwardly offset relation to the corresponding rear side rails 3 to provide the central frame section with an increased width relative to frame section 2. Side rails 7 are connected at their rear ends by a cross bar 8 connected also to the forward ends of the side rails 3 in a manner to be explained to thereby secure the rear frame section to the central frame section. Cross bar 8 is formed of a pair of generally channel-shaped members 9 lap-welded together in facing relation to provide a closed, four-sided section increasing in area in proceeding downwardly of the section in the manner shown in FIG. 3.

In operation, cross bar 8 is subjected to substantial torsional forces in response to vertical loads on the frame sections 2 and 6 due to their offset relation.

According to the present invention, cross bar 8 is stiffened or reinforced so as to prevent the torsional force imposed thereon from having a deforming effect by attaching the forward end of side rails 3 across two walls of the cross bar, thereby embracing three corners of the latter. An attachment formed according to the principle of the present invention and which is identical in all respects to the connection between the opposite end of the cross bar and the opposite side rail 3 is best shown in FIGS. 2 and 3. As shown therein, channel members 5 comprising side rail 3 diverge relative to each other adjacent the forward end of the side rail to form a split, widened end portion. Each member 5 is notched in an identical manner at its forward end and across substantially the full width of the channel web 10 to provide a pair of edges 11 and 12 disposed perpendicularly of one another and at acute angles with the longitudinal edges 13 and 14 of the side rail respectively. The notch defining edges 11 and 12 are formed integrally with the outwardly extending flanges 15 and 16 respectively. In accordance with the invention, flanged edges 11 and 12 are co-extensive with the corresponding upper and rear walls of cross bar 8 to permit side rails 3 to fully complement the cross bar as shown in FIG. 3.

For purposes of kick-up, the forward end of side rails 3 slopes or curves downwardly in proceeding forwardly of the rails.

The notched end of side rail 3 is secured to cross bar 8 by a series of short welds 17 with one weld extending generally along flanged edge 11, a second weld along flanged edge 12, and a third weld along the inner edge 18 of side rail 3 as shown in FIGS. 2 and 3. A fourth weld 17 extends along the cut-back lower flange 19 of the side rail. A series of corresponding welds 17 secure the other half of the split side rail end to the cross bar in identical fashion to that just described.

The aforedescribed notched construction of side rail end permits the side rail to embrace and rigidly support two of the four sides comprising cross bar 8 thus stabilizing three of the four corners of the bar and leaving only the inside, lower corner 20 unsupported. Since for any cross bar deformation, two or more corners must change their angular content, the described construction substantially inhibits section deformation and substantially increases the torsional rigidity of the cross bar. The invention eliminates the need for internal bulkheads heretofore employed to reinforce the cross bar and which because of their internal location suffered installation and maintenance drawbacks.

The widened end construction of side rails 3 together with the flanged construction of edges 11 and 12 provide a rigid, stable connection between the side rail and the cross bar and good stress distribution through the connected members. The flanged edges also maintain blanking loss at a minimal amount.

The attachment of the invention is of further advantage in that it permits the side rail to be kicked-up directly at the cross bar rather than from a point rearwardly thereof as in the conventional structures wherein the side rail is attached to only the rear wall of the cross bar. In the invention then, the side rail may be curved over more of its length on the forward side of the kick-up to thereby avoid the necessity of curving the side rail around a relatively short radius as in the prior art. This, in turn, reduces somewhat the build-up of localized stresses in the curved area of the side rail and has the further effect of reducing material requirements for the side rail.

The attachment method described herein may be used to equal advantage in a frame embodying torque boxes in lieu of the cross bars and for sectional shapes other than that specifically illustrated and described. In all cases, however, to impart the desired rigidity to the connector member it is necessary to attach the side rail in a manner to embrace all but two adjacent sides or walls of the member, leaving only one corner thereof unsupported. The principle of the invention may be utilized also to increase the rigidity of the side rails by providing the cross bars with notched end portions adapted to be secured to the side rail in the manner previously pointed out.

The invention provides a ready, inexpensive means of increasing the torsional resistance of a stressed vehicular frame member and greatly simplifies the fabrication techniques required.

Various methods of carrying out the present invention are contemplated as being within the scope of the following claim particularly pointing out and distinctly claiming the subject matter regarded as the nature of the invention.

I claim:

In a wide-hipped vehicle frame having side rails, a connecting cross bar welded to the complementary ends of the side rails and formed of a pair of generally channel-shaped members lap welded together to provide a closed four-sided section, a pair of frame members with each frame member formed of a pair of channeled plates welded together and extending from the cross bar, and with said frame members being spaced from each other and inwardly spaced from the side rails, the channeled plates respectively of each frame member diverging relative to each other as they approach the cross bar to form a split widened end portion having flanges which extend over and embrace the upper side of the cross bar and the side of the cross bar facing the frame members to provide a bulkhead support for the cross bar reinforcing three corners of the cross bar against deformation, welds joining the overlying edges of the respective frame member flanges to the cross bar, and a kick-up section provided in the frame members with the curvature of the kick-up starting directly at the cross bar to thereby increase the radius of curvature of the kick-up section and decrease localized stresses in the kick-up section of the side rail.

References Cited in the file of this patent

UNITED STATES PATENTS

| | | |
|---|---|---|
| 1,928,942 | Maddock | Oct. 3, 1933 |
| 2,118,257 | Maddock | May 24, 1938 |
| 2,188,879 | Ledwinka | Jan. 30, 1940 |
| 2,935,335 | Muller | May 3, 1960 |